(12) United States Patent
Abe et al.

(10) Patent No.: US 7,066,312 B2
(45) Date of Patent: Jun. 27, 2006

(54) FLUID TRANSMITTING SYSTEM WITH LOCK-UP CLUTCH

(75) Inventors: Hiroya Abe, Wako (JP); Tetsurou Maruyama, Wako (JP); Satoshi Kawamura, Shizuoka (JP); Akira Tsuboi, Shizuoka (JP)

(73) Assignees: Honda Motor Co., Ltd., Tokyo (JP); Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 10/798,888

(22) Filed: Mar. 12, 2004

(65) Prior Publication Data
US 2004/0251104 A1    Dec. 16, 2004

(30) Foreign Application Priority Data
Mar. 17, 2003   (JP)   ............................. 2003-072671

(51) Int. Cl.
F16H 41/26    (2006.01)
(52) U.S. Cl. .................................................... 192/3.29
(58) Field of Classification Search ............... 192/3.29, 192/70.27, 89.22, 106 F, 109 R, 109 F
See application file for complete search history.

(56) References Cited

U.S. PATENT DOCUMENTS 6,497,312 B1 *  12/2002  Sasse et al. ................ 192/3.29
6,698,561 B1 *   3/2004  Kundermann et al. ..... 192/3.29

FOREIGN PATENT DOCUMENTS

| JP | 55-54758 | 4/1980 |
| JP | 11-201260 | 7/1999 |
| JP | 2001-280444 | 10/2001 |

* cited by examiner

Primary Examiner—Saul Rodriguez
(74) Attorney, Agent, or Firm—Westerman, Hattori, Daniels & Adrian, LLP

(57) ABSTRACT

A fluid transmitting system includes a lock-up clutch whose clutch piston is disposed between a side cover connected to a pump impeller and a turbine runner. A Belleville spring for biasing the clutch piston to a clutch turning-on direction is mounted to a piston hub of the clutch piston slidably carried on a turbine hub so that the deformation attitude thereof is changed freely. A limiting means is provided between the clutch piston and the turbine runner for limiting the amount of retraction of the clutch piston to a constant value thereby preventing excessive deformation of the Belleville spring, when the clutch piston is retracted in a clutch turning-off direction. Thus, the Belleville spring for biasing the clutch piston of the lock-up clutch in the clutch turning-on direction can exhibit an intrinsic spring characteristic, and moreover the durability of the Belleville spring can be enhanced.

4 Claims, 5 Drawing Sheets

FLUID TRANSMITTING SYSTEM WITH LOCK-UP CLUTCH

BACKGROUND OF THE INVENTION

1. Field of the Invention

The present invention relates to a fluid transmitting system such as a torque converter and a fluid coupling, used in a power transmitting system for a vehicle or an industrial machine, and particularly to a fluid transmitting system with a lock-up clutch, comprising a pump impeller, a turbine runner which defines a circulation circuit between the turbine runner and the pump impeller, a side cover which is connected to the pump impeller and which defines a clutch chamber between the side cover and an outer side of the turbine runner to communicate with an outer peripheral portion of the circulation circuit, and a lock-up clutch disposed in the clutch chamber and capable of coupling the side cover and the turbine runner directly to each other, the lock-up clutch being comprised of a clutch piston axially movably connected to the turbine runner to divide the clutch chamber into an inner oil chamber section on the side of the turbine runner and an outer oil chamber section on the side of the side cover, a lock-up control means adapted to generate a difference in pressure between the inner oil chamber section and the outer oil chamber section to advance and retract the clutch piston to and from an inner side of the side cover, a friction engaging means adapted to bring the clutch piston and the side cover into friction engagement with each other when the clutch piston is pushed against the inner side of the side cover, and a resilient member disposed between the clutch piston and the turbine runner to bias the clutch piston toward the inner side of the side cover.

2. Description of the Related Art

Such fluid transmitting system with the lock-up clutch is already known, as disclosed in, for example, Japanese Patent Application Laid-open No. 55-54758.

In such a fluid transmitting system with the lock-up clutch, the resilient member for biasing the clutch piston toward the inner side of the side cover is arranged so that when the lock-up control means is operated to bring the lock-up clutch into engaged state, the delay of the operation of the clutch piston is eliminated, leading to an enhancement in responsiveness to the engagement of the lock-up clutch.

In the conventional fluid transmitting system with the lock-up clutch, one end of the resilient member is secured to a piston hub of the clutch piston and hence, there is a possibility that the deformation attitude of the resilient member is restrained by the piston hub and as a result, the resilient member generates a needless stress and cannot exhibit an intrinsic spring characteristic, and further the durability of the resilient member is deteriorated.

SUMMARY OF THE INVENTION

Accordingly, it is an object of the present invention to provide a fluid transmitting system with a lock-up clutch, wherein the resilient member can exhibit the intrinsic spring characteristic, and the durability of the resilient member can be ensured.

To achieve the above object, according to a first feature of the present invention, there is provided a fluid transmitting system with a lock-up clutch, comprising a pump impeller, a turbine runner which defines a circulation circuit between the turbine runner and the pump impeller, a side cover which is connected to the pump impeller and which defines a clutch chamber between the side cover and an outer side of the turbine runner to communicate with an outer peripheral portion of the circulation circuit, and a lock-up clutch disposed in the clutch chamber and capable of coupling the side cover and the turbine runner directly to each other, the lock-up clutch being comprised of a clutch piston axially movably connected to the turbine runner to divide the clutch chamber into an inner oil chamber section on the side of the turbine runner and an outer oil chamber section on the side of the side cover, a lock-up control means adapted to generate a difference in pressure between the inner oil chamber section and the outer oil chamber section to advance and retract the clutch piston to and from an inner side of the side cover, a friction engaging means adapted to bring the clutch piston and the side cover into friction engagement with each other when the clutch piston is pushed against the inner side of the side cover, and a resilient member disposed between the clutch piston and the turbine runner to bias the clutch piston toward the inner side of the side cover, wherein the resilient member is mounted to a piston hub of the clutch piston axially slidably carried on a turbine hub of the turbine runner so that the deformation attitude of the resilient member is changed freely, and a limiting means is provided between the clutch piston and the turbine runner for limiting the amount of movement of the clutch piston toward the turbine runner to a constant value thereby preventing the excessive resilient deformation of the resilient member, when the clutch piston is urged toward the turbine runner while producing the deformation of the resilient member thereby bringing the friction engaging means into a non-operative state.

With the first feature, when the lock-up clutch is controlled into a turned-off state, the movement of the clutch piston in a clutch turning-off direction is limited to the constant value by the limiting means, whereby the amount of deformation of the resilient member is suppressed to a constant value, and the resilient member need not bear an excessive load. Moreover, since the resilient member is mounted to the piston hub to have free deformation attitude, the resilient member can change its attitude freely even during deformation thereof. Therefore, the resilient member generates no needless stress, always exhibits a desired spring characteristic, bears no excessive load, and thus an enhancement in durability of the resilient member can be achieved.

According to a second feature of the present invention, in addition to the first feature, the piston hub is provided with an annular slip-off preventing portion which defines the mounting groove between the slip-off preventing portion and one side of the clutch piston.

With the second feature, the resilient member mounted in the mounting groove is inhibited from being disengaged from the piston hub by the slip-off preventing portion, in whatever attitude the fluid transmitting system is placed during assembling thereof. This can contribute to an enhancement in assemblability of the fluid transmitting system.

According to a third feature of the present invention, in addition to the second feature, the piston hub is provided in one side thereof with an annular recess whose bottom surface constitutes an inner wall of the mounting groove.

With the third feature, it is possible to ensure a sufficient width of the mounting groove, while minimizing the amount of protrusion of the piston hub from an outermost side of the clutch piston on the side of the turbine runner, and to achieve the axial compactness of the piston hub by an enhancement in space efficiency.

According to a fourth feature of the present invention, in addition to the second or third feature, the clutch piston is comprised of a piston outer periphery-side member connected to the friction engaging means, and a piston inner periphery-side member which has been subjected to a surface hardening treatment and which has the piston hub and is coupled to the piston outer periphery-side member.

With the fourth feature, in the clutch piston, the piston inner periphery-side member as a relatively small part having the piston hub, is subjected to the surface hardening treatment. Therefore, it is possible to subject a large number of piston inner periphery-side members at a time to the hardening treatment by using a small-scale treating equipment, to enhance the wear resistances of a sliding surface of the piston hub on the turbine hub and a sliding surface of the mounting groove on the resilient member, while providing a reduction in cost.

The fluid transmitting system corresponds to a torque converter T in each of embodiments of the present invention which will be described hereinafter. In addition, the friction engaging means corresponds to a friction surface 5b and a friction lining 28; the lock-up control means corresponds to a lock-up control valve 42; and the resilient member corresponds to a Belleville spring 33.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of preferred embodiments with reference to the accompanying drawings.

Figure 1:
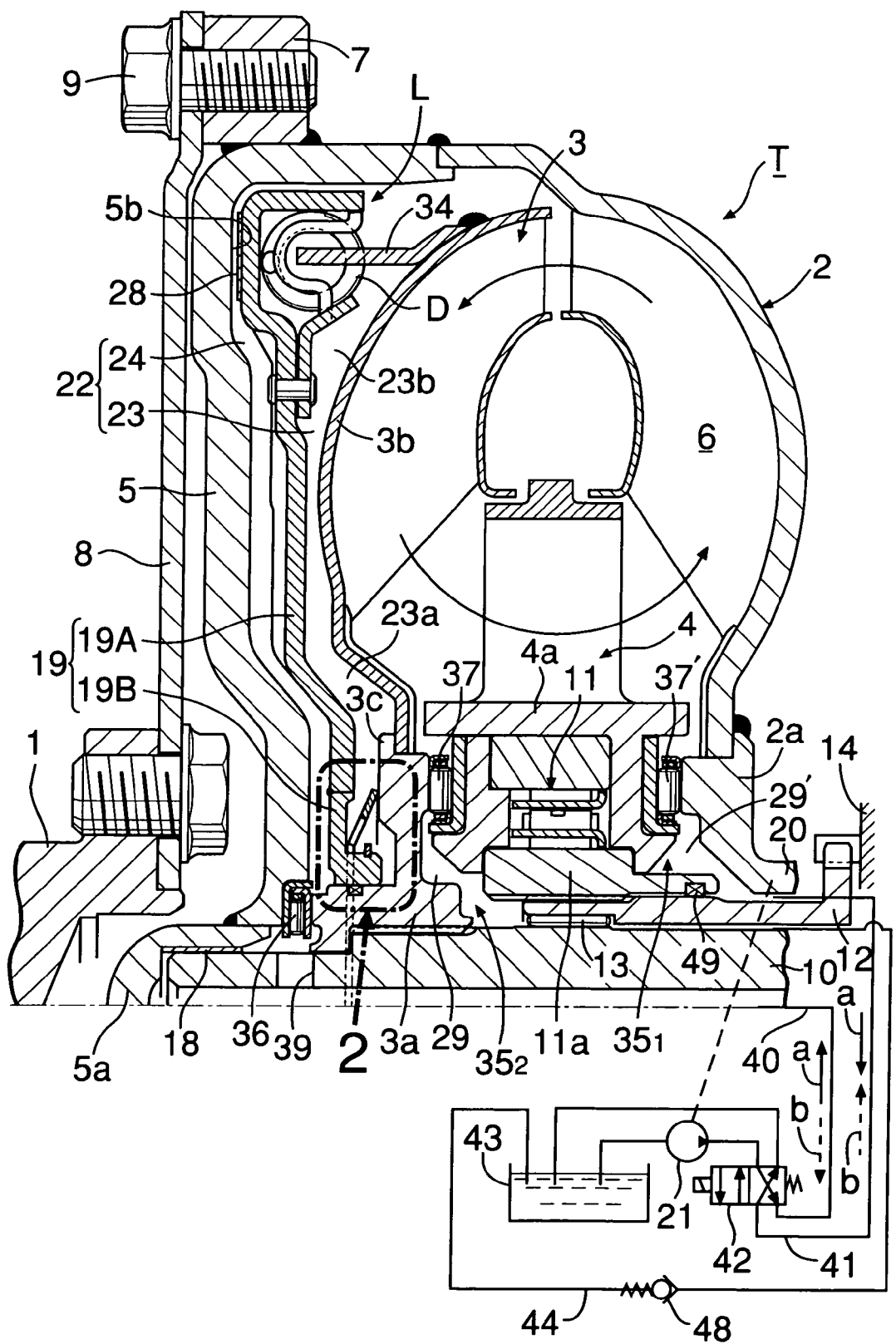
FIG. 1 is a vertical sectional view of a torque converter with a lock-up clutch according to a first embodiment of the present invention.

Referring first to FIG. 1, a torque converter T as a fluid transmitting device includes a pump impeller 2, a turbine runner 3 disposed to face the pump impeller 2, and a stator 4 disposed between inner peripheral portions of the pump impeller 2 and the turbine runner 3. A circulation circuit 6 for transmitting a power by a working oil is defined between these three members 2, 3 and 4.

A side cover 5 is integrally connected to an outer peripheral portion of the pump impeller 2 by welding to cover an outer side of the turbine runner 3. A plurality of connecting bosses 7 arranged circumferentially are welded to an outer peripheral surface of the side cover 5, and a drive plate 8 coupled to a crankshaft 1 of an engine is secured to the connecting bosses 7 by bolts 9. A thrust needle bearing 36 is interposed between a turbine hub 3a at a center portion of the turbine runner 3 and the side cover 5.

An output shaft 10 arranged coaxially with the crankshaft 1 is disposed at a center portion of the torque converter T.

The output shaft 10 is spline-fitted to the turbine hub 3a and rotatably supported on a support tube 5a at a center portion of the side cover 5 with a bearing bush 15 interposed therebetween. The output shaft 10 is a main shaft of a multi-stage transmission which is not shown.

A cylindrical stator shaft 12 is disposed around an outer periphery of the output shaft 10 and supports a stator hub 4a at a center portion of the stator 4 with a free wheel 11 interposed therebetween, and a needle bearing 13 is interposed between the output shaft 10 and the stator shaft 12 for permitting the relative rotation of the shafts 10 and 12. The stator shaft 12 is non-rotatably supported at its outer end on a transmission case 14.

Thrust needle bearings 37 and 37' are interposed between axially opposite end faces of the stator hub 4a and end faces of the hubs 2a and 3a of the pump impeller 2 and the turbine runner 3 opposed to such axially opposite end faces, so that the axial movements of the turbine runner 3 and the stator 4 between the pump impeller 2 and the side cover 5 are restrained by the thrust needle bearings 37 and 37' and the above-described thrust needle bearing 36.

An auxiliary-driving shaft 20 coupled to the pump impeller 2 is relatively rotatably disposed around an outer periphery of the stator shaft 12, so that an oil pump 21 for supplying the working oil to the torque converter T is driven by the auxiliary-driving shaft 20.

A clutch chamber 22 is defined between the turbine runner 3 and the side cover 5 to communicate at its outer periphery with the circulation circuit 6, and a lock-up clutch L capable of directly coupling the turbine runner 3 and the side cover 5 to each other is mounted in the clutch chamber 22. A clutch piston 19 forming a main member of the lock-up clutch L is disposed in the clutch chamber 22, so that it divides the clutch chamber 22 into an inner oil cumber section 23 on the side of the turbine runner 3 and an outer oil chamber section 24 on the side of the side cover 5. The clutch piston 19 has, at its center portion, a piston hub 19a which is slidably carried on an outer peripheral surface of the turbine hub 3a with a seal member 26 interposed therebetween. A friction lining 28 opposed to an annular friction surface 5b formed on an inner side of the side cover 5 is bonded to one side of the clutch piston 19. The clutch piston 19 is also axially movably connected to a transmitting plate 34 fixedly mounted on an outer side of the turbine runner 3 through a known torque damper D.

Figure 2:
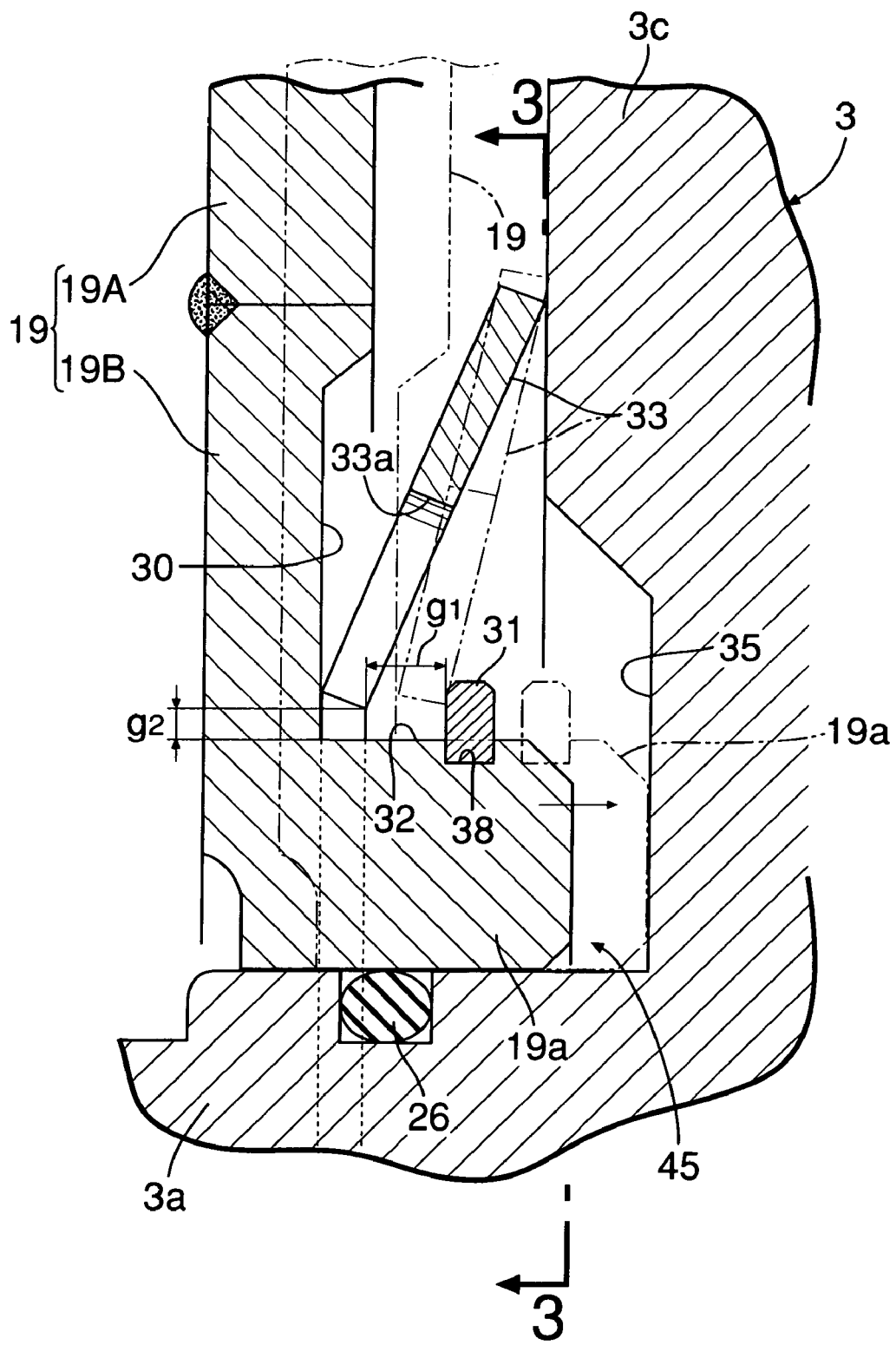
FIG. 2 is an enlarged view of an area indicated by 2 in FIG. 1.

As shown in FIGS. 1 and 2, the clutch piston 19 is comprised of: a piston outer periphery-side member 19A having a wider region on the side of an outer periphery of a sidewall of the clutch piston 19; a narrower region on the side of an inner periphery of the sidewall; and a piston inner periphery-side member 19B subjected to a surface hardening treatment such as a carbonitriding treatment and having the piston hub 19a protruding from an inner peripheral end of the narrower region toward the turbine runner 3. Both the members 19A and 19B are fitted and welded to each other for integration thereof.

As clearly shown in FIG. 2, an annular recess 30 opening toward the turbine runner 3 is formed in one side of the piston inner periphery-side member 19B, and an annular mounting groove 32 is defined around an outer periphery of the piston hub 19a by a bottom surface of the annular recess 30 and a snap ring 31 locked to an outer periphery of a tip end of the piston hub 19a. Namely, the mounting groove 32 has an inner wall formed by the bottom surface of the annular recess 30, and an outer wall formed by the snap ring 31. A Belleville spring 33 is mounted in the mounting groove 32 and compressed between the clutch piston 19 and the turbine runner 3 to bias the clutch piston 19 toward the side cover 5. Reference numeral 38 denotes a locking groove for the snap ring 31, which is formed in the piston hub 19a. The snap ring 31 is mounted in the locking groove 38 after fitting the Belleville spring 33 around the outer periphery of the piston hub 19a. Thus, the mounting of the Belleville spring 33 in the mounting groove 32 can be carried out easily without deforming an end of an inner periphery of the Belleville spring 33.

The processing for the annular recess 30 and the locking groove 38 is carried out before the surface hardening treatment of the piston inner periphery-side member 19B.

On the other hand, a shell-mounting flange 3c for mounting a turbine shell 3b by welding is integrally formed on an outer periphery of the turbine hub 3a, and an annular recess 35 for receiving a tip end of the piston hub 19a is formed in one side of the shell-mounting flange 3c. A limiting means 45 is formed by a bottom surface of the annular recess 35 and a tip end face of the piston hub 19a to define a limit of the movement of the clutch piston 19 in a clutch turning-off direction by the abutment between the bottom surface of the annular recess 35 and the tip end face of the piston hub 19a (see a dashed line in FIG. 2).

The Belleville spring 33 is mounted under compression between the bottom surface of the annular recess 30 in the piston inner periphery-side member 19B and one side of an outer periphery of the annular recess 35 in the shell-mounting flange 3c. In this case, an axial preset load applied to the Belleville spring 33 is set at a magnitude such that in a state in which there is no hydraulic pressure generated in the inner and outer oil chamber sections 23 and 24, the friction lining 28 of the clutch piston 19 is brought into pressure contact with the friction surface 5b of the side cover 5, but when the hydraulic pressure in the outer oil chamber section 24 is raised to equal to or higher than that in the inner oil chamber section 23, the movement of the clutch piston 19 in the clutch turning-off direction is permitted by virtue of a difference between the pressures.

When the Belleville spring 33 is deformed with the axial movement of the clutch piston 19, its inner peripheral end is also displaced axially and radially to some extent due to the change of its attitude, and when such displacement is restrained, the Belleville spring 33 cannot exhibit a desired spring characteristic. Therefore, in order to permit the axial and radial movement of the inner peripheral end of the Belleville spring 33, a gap $g_1$ is provided between the Belleville spring 33 and the snap ring 31, and a gap $g_2$ is provided between the Belleville spring 33 and the piston hub 19a.

Figure 3:
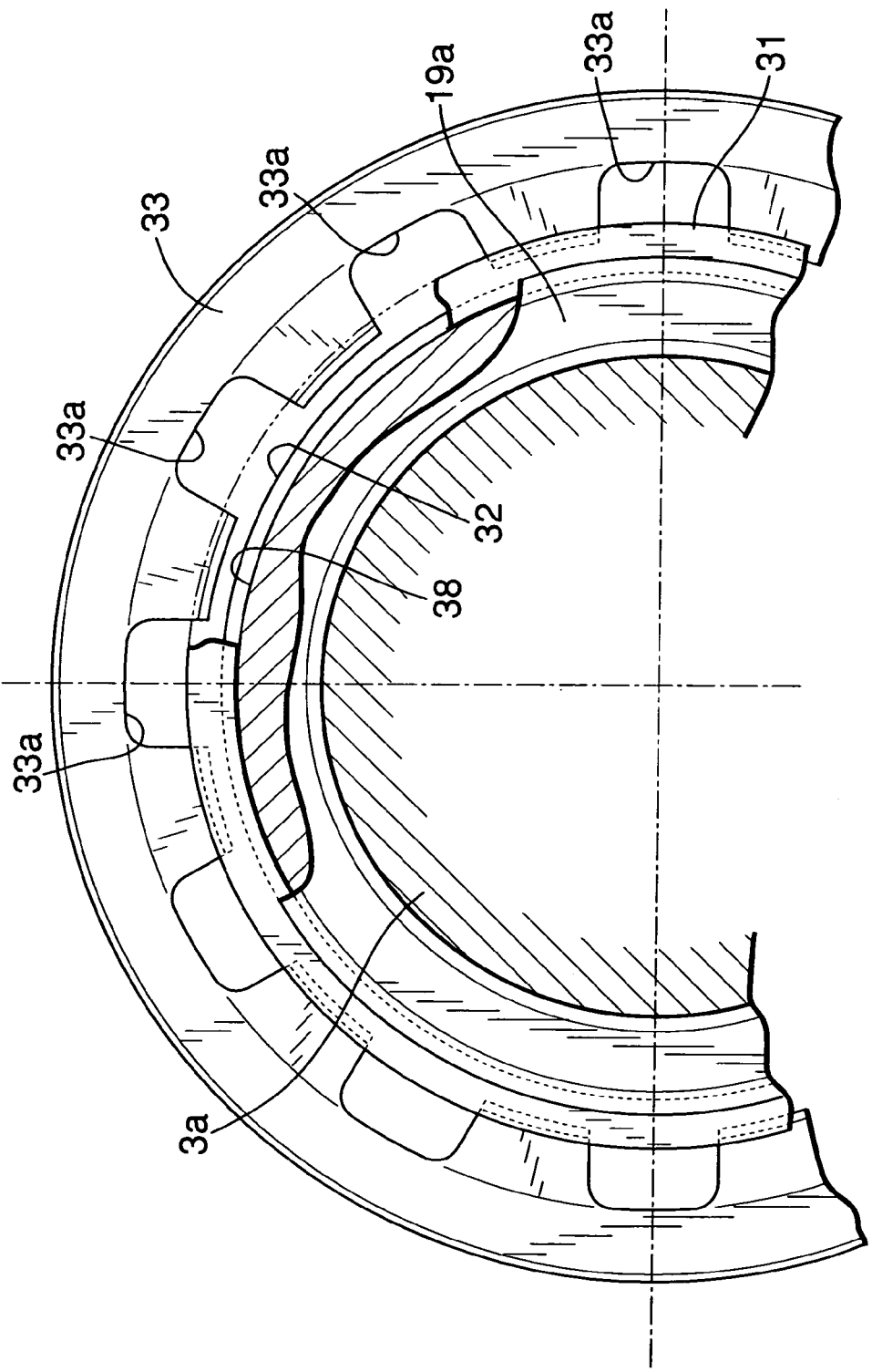
FIG. 3 is a sectional view taken along a line 3—3 in FIG. 2.

As shown in FIG. 3, a large number of slits 33a are formed radially in the Belleville spring 33 to open into an inner periphery of the Belleville spring 33 in order to relatively facilitate the axial resilient deformation of the Belleville spring 33.

Returning to FIG. 1, a first oil passage 40 is provided in a center portion of the output shaft 10 to communicate with the outer oil chamber section 24 of the clutch chamber 22 through a transverse bore 39 and the thrust needle bearing 36. A second oil passage 41 is defined between the auxiliary-driving shaft 20 and the stator shaft 12, and communicates with an inner periphery of the circulation circuit 6 through an annular oil passage 29' between the pump hub 2a and the stator hub 4a and the thrust needle bearing 37'.

A third oil passage 44 is defined between the output shaft 10 and the stator shaft 12, and communicates with the inner periphery of the circulation circuit 6 through an annular oil passage 29 between the turbine hub 3a and the stator hub 4a and the thrust needle bearing 37. In this case, a seal member 49 is interposed between an inner race 11a of the free wheel 11 and the stator shaft 12 in order to cut off the communication between the annular oil passages 29 and 29'.

The first oil passage 40 and the second oil passage 41 are adapted to be connected alternatively to a discharge port of the oil pump 21 and an oil sump 43 by a lock-up control valve 42. The first oil passage 40 and the second oil passage 41 are also connected to the oil sump 43 through a relief valve 48 for retaining each of the circulation circuit 6 and a primary inner oil chamber portion 23a at a predetermined hydraulic pressure. Therefore, surplus pressures in the circulation circuit 6 and the primary inner oil chamber portion 23a are released into the oil sump 43 through the relief valve 48.

The operation of this embodiment will be described below.

In a driven state of the torque converter T, the lock-up control valve 42 is controlled by an electronic control unit (not shown) so as to connect the first oil passage 40 to the discharge port of the oil pump 21 and on the other hand, to connect the second oil passage 41 to the oil sump 43. Therefore, a torque output from the crankshaft 1 of the engine is transmitted through the drive plate 8 and the side cover 5 to the pump impeller 2 to rotate the pump impeller 2, and when the oil pump 21 is also driven, a working oil discharged by the oil pump 21 flows as shown by an arrow a from the lock-up control valve 42 sequentially via the first oil passage 40, the transverse bore 39, the thrust needle bearing 36 and the outer and inner oil chamber sections 24 and 23 of the clutch chamber 22 into the circulation circuit 6 to fill the circuit 6, and thereafter flows via the thrust needle bearing 37' and the annular oil passage 29' into the second oil passage 41, and returns through the lock-up control valve to the oil sump 43.

Thus, in the clutch chamber 22, the pressure in the outer oil chamber section 24 is higher than that in the inner oil chamber section 23 in virtue of the flow of the working oil as described above, and the clutch piston 19 is retracted away from the friction surface 5b of the side cover 5 against the preset load of the Belleville spring 33 by a difference between the pressures in the outer and inner chamber sections 24 and 23. Thus, the lock-up clutch L is in a turned-off state to permit the relative rotation of the pump impeller 2 and the turbine runner 3. Therefore, when the pump impeller 3 is driven in rotation from the crankshaft 1, the working oil filling the circulation circuit 6 is circulated in the circulation circuit 6 as shown by an arrow a, whereby the rotational torque of the pump impeller 2 is transmitted to the turbine runner 2 to drive the output shaft 10.

If there is a torque-amplifying effect produced between the pump impeller 2 and the turbine runner 3 at this time, a reaction force attendant on the torque-amplifying effect is borne on the stator 4, and the stator 4 is fixed by a locking action of the free wheel 11.

When the lock-up control valve 42 is now switched over by the electronic control unit to bring the lock-up clutch L into an engaged state during coupling of the torque converter T or during an engine brake, the working oil discharged by the oil pump 21 flows as shown by an arrow b in a direction opposite from the above-described direction from the lock-up control valve 42 sequentially via the second oil passage 41, the annular oil passage 29' and the thrust needle bearing 37' into the circulation circuit 6 and also flows from the side of an outer periphery of the circulation circuit 6 into the inner oil chamber section 23 of the clutch chamber 22.

On the other hand, the outer oil chamber section 24 of the clutch chamber 22 is opened to the oil sump 43 through the first oil passage 40 and the lock-up control valve 42.

As a result, the pressure in the inner oil chamber section 23 is raised, and the pressure in the outer oil chamber section 24 is dropped. Because the clutch piston 19 is biased toward the side cover 5, i.e., in a clutch turning-on direction by the Belleville spring 33, however, the advancement of the clutch piston 19 in the clutch turning-on direction is started immediately at a stage at which the pressures in both the oil chamber sections 23 and 24 are equalized to each other, thereby bringing the friction lining 28 into pressure contact with the friction surface 5b of the side cover 5. Therefore, the leakage of the working oil from the inner oil chamber section 23 into the outer oil chamber section 24 is inhibited by the pressure contact and hence, the raising of the pressure in the inner oil chamber section 23 is carried out efficiently and quickly by the flowing of the working oil from the circulation circuit 6 into the inner oil chamber section 23. Thus, the clutch piston 19 is urged quickly and powerfully toward the friction surface 5b of the side cover 5, whereby the lock-up clutch L is brought with a good responsiveness into a turned-off state to immediately prevent the slipping between the pump impeller 2 and the turbine runner 3. Thus, the transmitting efficiency of the torque converter T can be enhanced effectively.

When the lock-up clutch L has been controlled into the turned-off state, the amount of retraction of the clutch piston 19 in the clutch turning-off direction is limited to a constant value by bringing the tip end face of the piston hub 19a into abutment against the bottom surface of the annular recess 35 in the shell-mounting flange 3c in the turbine runner 3 and hence, the amount of axial deformation of the Belleville spring 33 is suppressed to a constant value. Therefore, even if the difference in pressure between the outer oil chamber section 24 and the inner oil chamber section 23 is increased to equal to or larger than a predetermined value, it is avoided that an excessive axial load is applied to the Belleville spring 33.

Moreover, the existence of the gaps $g_1$ and $g_2$ between the Belleville spring 33 and the snap ring 31 and between the Belleville spring 33 and the piston hub 19a ensures that the inner peripheral end of the Belleville spring 33 can change its attitude freely even during deformation of the Belleville spring 33 attendant on the advancement and retraction of the clutch piston 19. Therefore, the Belleville spring 33 generates no needless stress; always exhibits a desired spring characteristic; bears no excessive load; and thus an enhancement in durability of the Belleville spring 33 can be achieved.

One sidewall of the mounting groove 32 on the piston hub 19a, on which the Belleville spring 33 is mounted, is formed by the bottom surface of the annular recess 30 in the piston inner periphery-side member 19B. Therefore, a sufficient width of the mounting groove 32 in the Belleville spring 33 can be ensured, while minimizing the amount of protrusion of the piston hub 19a from the outermost side of the clutch piston 19 on the side of the turbine runner 3, so that the axial compactness of the piston hub 19a can be achieved by an enhancement in space efficiency.

Further, the tip end of the piston hub 19a is received in the annular recess 35 in the shell-mounting flange 3c and hence, the space efficiency is further enhanced, so that the compactness of the peripheral portions of the piston hub 19a and the turbine hub 3a can be achieved.

Yet further, only the piston inner periphery-side member 19B as a relatively small part in the clutch piston 19, which has the piston hub 19a and the mounting groove 32, has been subjected to the surface hardening treatment. Therefore, it is possible to subject a large number of piston inner periphery-side members 19B at a time to the surface hardening treatment by using a small-scale treating equipment, and to enhance the wear resistances of a sliding surface of the piston hub 19a on the turbine hub 3a and a sliding surface of the mounting groove 32 on the Belleville spring 33, while providing a reduction in cost.

The outer sidewall of mounting groove 32 in the piston hub 19a is formed by the snap ring 31 and hence, the Belleville spring 33 mounted in the mounting groove 32 is inhibited from being disengaged from the piston hub 19a by the snap ring 31, in whatever attitude the torque converter T is placed during assembling thereof, whereby an enhancement in assemblability of the torque converter T can be achieved.

Figure 4:
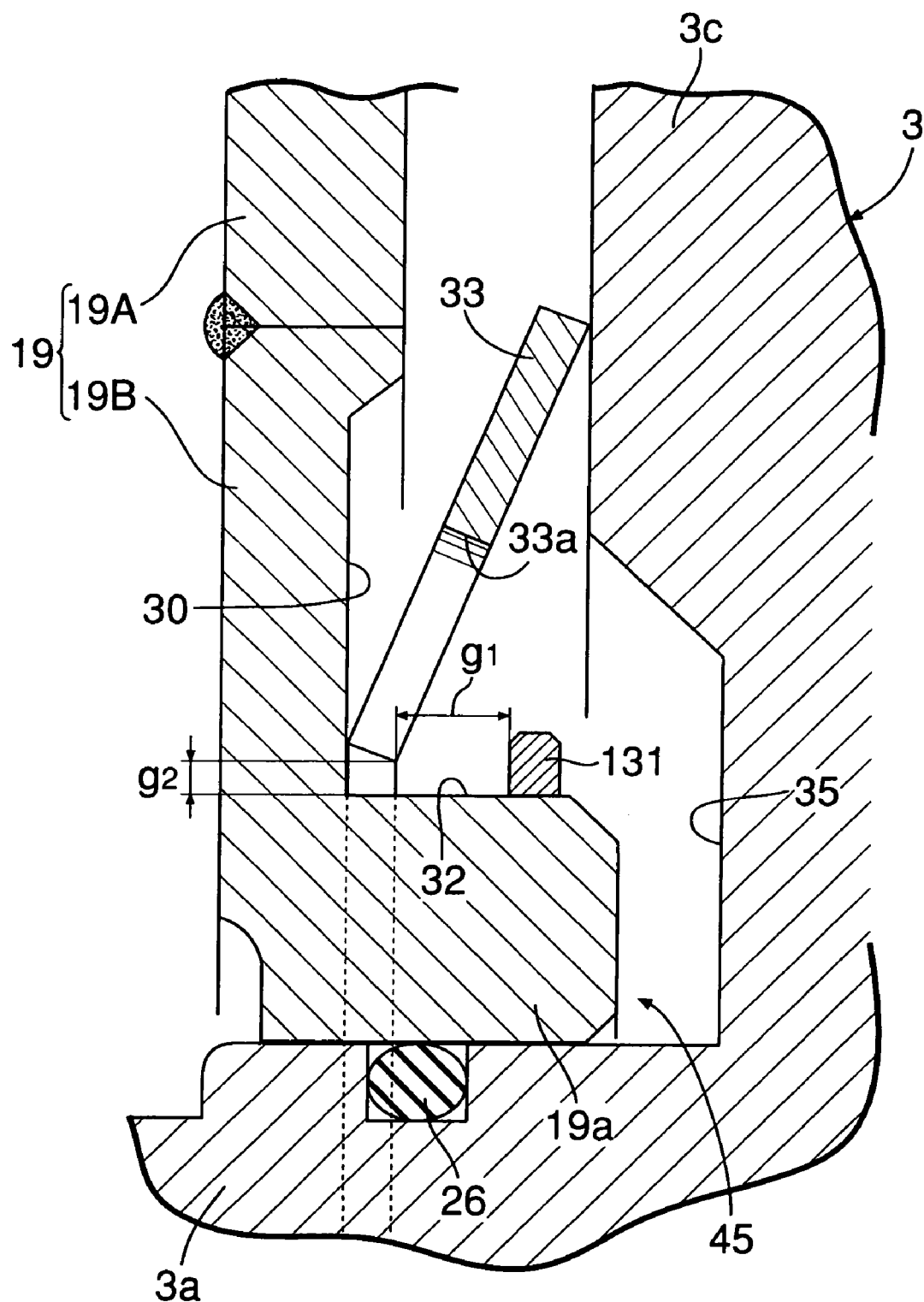
FIG. 4 is a view similar to FIG. 2, but showing a second embodiment of the present invention.

A second embodiment of the present invention shown in FIG. 4 will now be described.

In the second embodiment, an endless ring member 131 is press-fitted over or welded and fixed to an outer periphery of a piston hub 19a in place of the snap ring 31 in the first embodiment. The arrangement of the other components is not changed from that in the first embodiment and hence, portions or components corresponding to those in the previous embodiment are designated by the same reference numerals and symbols, and the description of them is omitted.

Finally, a third embodiment of the present invention shown in FIG. 5 will be described below.

In the third embodiment, a flange 231 is integrally formed on a piston hub 19a in place of the snap ring 31 and the ring member 131 in the previous two embodiments. In this case, the mounting of the Belleville spring 33 in the mounting groove 32 is carried out by flexing the inner peripheral end of the Belleville spring 33 to increase the inner diameter of the Belleville spring 33.

Figure 5:
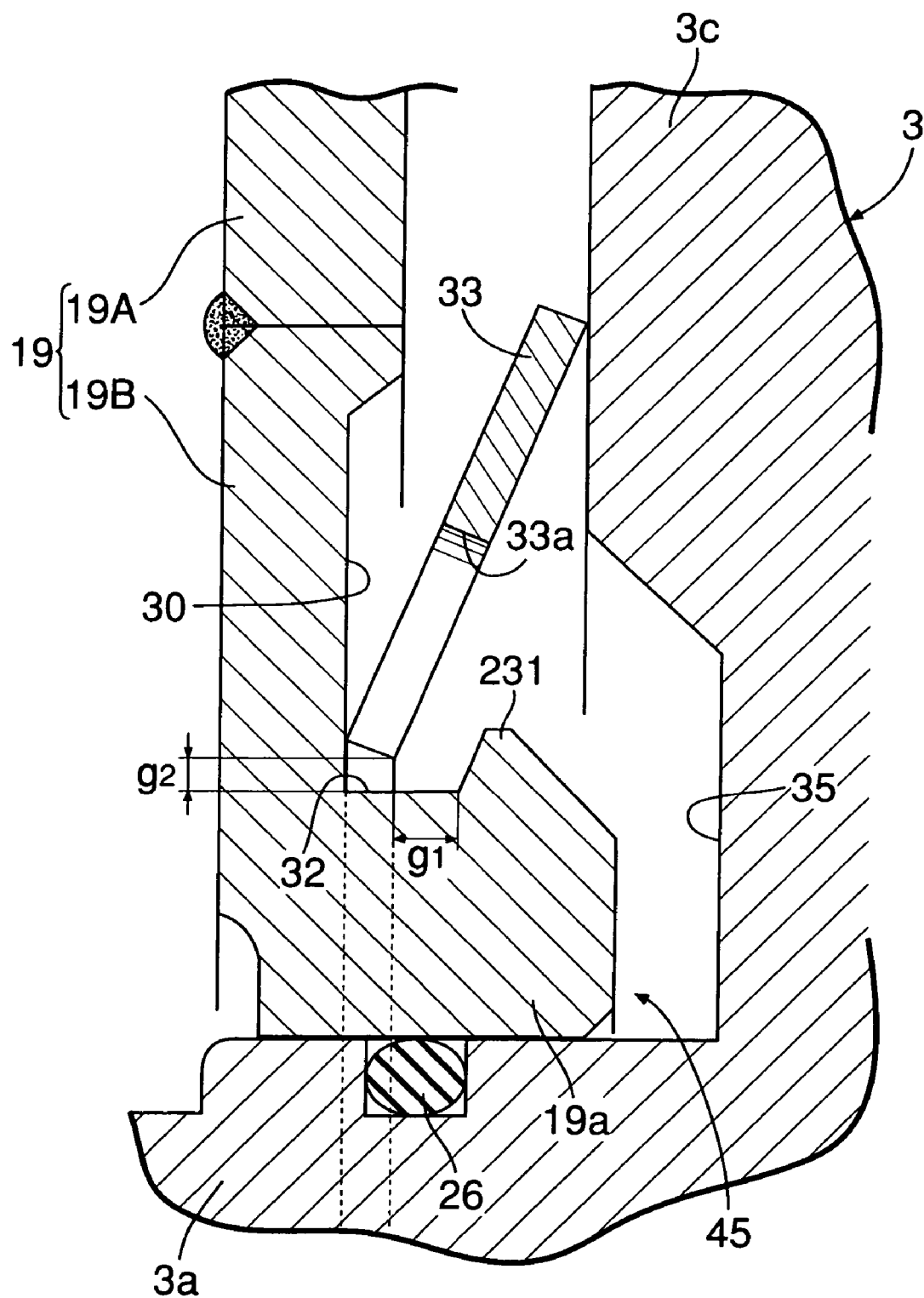
FIG. 5 is a view similar to FIG. 2, but showing a third embodiment of the present invention.

The arrangement of the other components is not changed from that in each of the previous embodiments and hence, portions or components corresponding to those in each of the previous embodiments are designated by the same numerals and symbols in FIG. 5, and the description of them is omitted.

Although the embodiments of the present invention have been described in detail, it will be understood that the present invention is not limited to the above-described embodiments, and various modifications in design may be made without departing from the subject matter of the invention defined in the claims. For example, the present invention is also applicable to a fluid coupling having no stator 4.

What is claimed is:

1. A fluid transmitting system with a lock-up clutch, comprising a pump impeller, a turbine runner which defines a circulation circuit between the turbine runner and the pump impeller, a side cover which is connected to the pump impeller and which defines a clutch chamber between the side cover and an outer side of the turbine runner to communicate with an outer peripheral portion of the circulation circuit, and the lock-up clutch disposed in the clutch chamber and capable of coupling the side cover and the turbine runner directly to each other, the lock-up clutch being comprised of a clutch piston axially movably connected to the turbine runner to divide the clutch chamber into an inner oil chamber section on the side of the turbine runner and an outer oil chamber section on the side of the side cover, a lock-up control means adapted to generate a difference in pressure between the inner oil chamber section and the outer oil chamber section to advance and retract the clutch piston to and from the side cover, a friction engaging means adapted to bring the clutch piston and the side cover into friction engagement with each other when the clutch piston is pushed against the side cover, and a resilient member disposed between the clutch piston and the turbine runner to bias the clutch piston toward the side cover, wherein the resilient member is mounted to a piston hub of the clutch piston axially slidably carried on a turbine hub of the turbine runner so that the deformation attitude of the resilient member is changed freely, and a limiting means is provided between the clutch piston and the turbine runner for limiting the amount of movement of the clutch piston toward the turbine runner to a constant value thereby preventing the excessive resilient deformation of the resilient member, when the clutch piston is urged toward the turbine runner while producing the deformation of the resilient member thereby bringing the friction engaging means into a non-operative state, and wherein the piston hub is provided with an annular slip-off preventing portion which defines a mounting groove between the slip-off preventing portion and one side of the clutch piston.

2. A fluid transmitting system with a lock-up clutch according to claim 1, wherein the piston hub is provided in one side thereof with an annular recess whose bottom surface constitutes an inner wall of the mounting groove.

3. A fluid transmitting system with a lock-up clutch according to claim 1 or 2, wherein the clutch piston is comprised of a piston outer periphery-side member connected to the friction engaging means, and a piston inner periphery-side member which has been subjected to a surface hardening treatment and which has the piston hub and is coupled to the piston outer periphery-side member.

4. A fluid transmitting system with a lock-up clutch, comprising a pump impeller, a turbine runner which defines a circulation circuit between the turbine runner and the pump impeller, a side cover which is connected to the pump impeller and which defines a clutch chamber between the side cover and an outer side of the turbine runner to communicate with an outer peripheral portion of the circulation circuit, and the lock-up clutch disposed in the clutch chamber and capable of coupling the side cover and the turbine runner directly to each other, the lock-up clutch being comprised of a clutch piston axially movably connected to the turbine runner to divide the clutch chamber into an inner oil chamber section on the side of the turbine runner and an outer oil chamber section on the side of the side cover, a lock-up control means adapted to generate a difference in pressure between the inner oil chamber section and the outer oil chamber section to advance and retract the clutch piston to and from the side cover, a friction engaging means adapted to bring the clutch piston and the side cover into friction engagement with each other when the clutch piston is pushed against the side cover, and a resilient member disposed between the clutch piston and the turbine runner to bias the clutch piston toward the side cover, wherein the resilient member is mounted to piston hub of the clutch piston axially slidably carried on a turbine hub of the turbine runner so that the deformation attitude of the resilient member is changed freely, and wherein the turbine runner comprises a shell-mounting flange provided at an outer periphery of the turbine hub, and an annular recess for receiving a tip end of the piston hub is formed in one side of the shell-mounting flange, and a limiting means is provided by abutment between a bottom surface of the annular recess and a tip end face of the piston hub for limiting the amount of movement of the clutch piston toward the turbine runner to a constant value thereby preventing an excessive resilient deformation of the resilient member, when the clutch piston is urged toward the turbine runner while producing a deformation of the resilient member thereby bringing the friction engaging means into a non-operative state.

* * * * *